US009503664B2

(12) United States Patent
Nakazawa

(10) Patent No.: US 9,503,664 B2
(45) Date of Patent: *Nov. 22, 2016

(54) PHOTOELECTRIC CONVERSION ELEMENT, IMAGE READING DEVICE, AND IMAGE FORMING APPARATUS

(71) Applicant: RICOH COMPANY, LIMITED, Tokyo (JP)

(72) Inventor: Masamoto Nakazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/143,426

(22) Filed: Dec. 30, 2013

(65) Prior Publication Data

US 2014/0204427 A1 Jul. 24, 2014

(30) Foreign Application Priority Data

Jan. 18, 2013 (JP) ................................ 2013-007795

(51) Int. Cl.
H04N 1/04 (2006.01)
H04N 5/378 (2011.01)
H04N 5/369 (2011.01)

(52) U.S. Cl.
CPC ............ *H04N 5/378* (2013.01); *H04N 5/3692* (2013.01)

(58) Field of Classification Search
CPC ........ H04N 1/40; H04N 1/401; H04N 1/403; H04N 1/4052; H04N 1/193; H04N 3/1581; H04N 1/40056; H04N 1/031; H04N 1/03; H04N 2201/03138; H04N 5/378; H04N 5/3692; H01L 27/14665; G06T 3/4007
USPC ............... 358/445, 482, 483, 514, 471, 515; 250/208.1
See application file for complete search history.

(56) References Cited

U.S. PATENT DOCUMENTS

| 6,094,281 | A  | * | 7/2000  | Nakai ...................... G07D 7/12 250/208.1 |
| 7,408,683 | B2 | * | 8/2008  | Sato et al. ...................... 358/474 |
| 7,652,805 | B2 | * | 1/2010  | Oguri et al. ................... 358/482 |
| 8,643,918 | B2 | * | 2/2014  | Sasaki ............................ 358/482 |
| 2006/0176201 | A1 | * | 8/2006  | Kimura et al. ................ 341/144 |
| 2007/0188638 | A1 |   | 8/2007  | Nakazawa et al. |
| 2008/0094271 | A1 |   | 4/2008  | Tooyama et al. |
| 2008/0252787 | A1 |   | 10/2008 | Nakazawa et al. |
| 2009/0174588 | A1 | * | 7/2009  | Muenter et al. ............. 341/155 |
| 2010/0027061 | A1 |   | 2/2010  | Nakazawa |

(Continued)

FOREIGN PATENT DOCUMENTS

| JP | 2001-094734 | 4/2001 |
| JP | 2006-222688 | 8/2006 |
| JP | 2007-019682 | 1/2007 |

OTHER PUBLICATIONS

U.S. Appl. No. 13/912,341, filed Jun. 7, 2013 Inventor: Masamoto Nakazawa.

*Primary Examiner* — Cheukfan Lee
(74) *Attorney, Agent, or Firm* — Oblon, McClelland, Maier & Neustadt, L.L.P.

(57) ABSTRACT

A photoelectric conversion element includes: a plurality of AD conversion units that convert respective analog signals representing amounts of charge stored in a plurality of light receiving elements into digital signals in parallel; and a parallel-serial conversion unit that performs parallel-serial conversion on the digital signals into which the analog signals have been converted in parallel by the AD conversion units.

18 Claims, 14 Drawing Sheets

(56) References Cited

U.S. PATENT DOCUMENTS

| | | |
|---|---|---|
| 2010/0171998 A1 | 7/2010 | Nakazawa |
| 2011/0026083 A1 | 2/2011 | Nakazawa |
| 2011/0051201 A1 | 3/2011 | Hashimoto et al. |
| 2011/0063488 A1 | 3/2011 | Nakazawa |
| 2012/0008173 A1 | 1/2012 | Konno et al. |
| 2012/0092732 A1 | 4/2012 | Nakazawa |
| 2012/0224205 A1 | 9/2012 | Nakazawa |
| 2013/0063792 A1 | 3/2013 | Nakazawa |
| 2014/0204432 A1* | 7/2014 | Hashimoto et al. .......... 358/475 |

\* cited by examiner

FIG.13
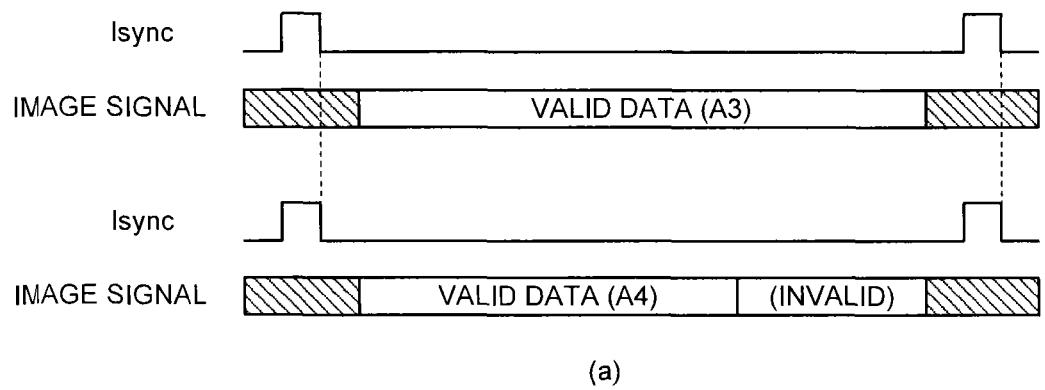
(a)
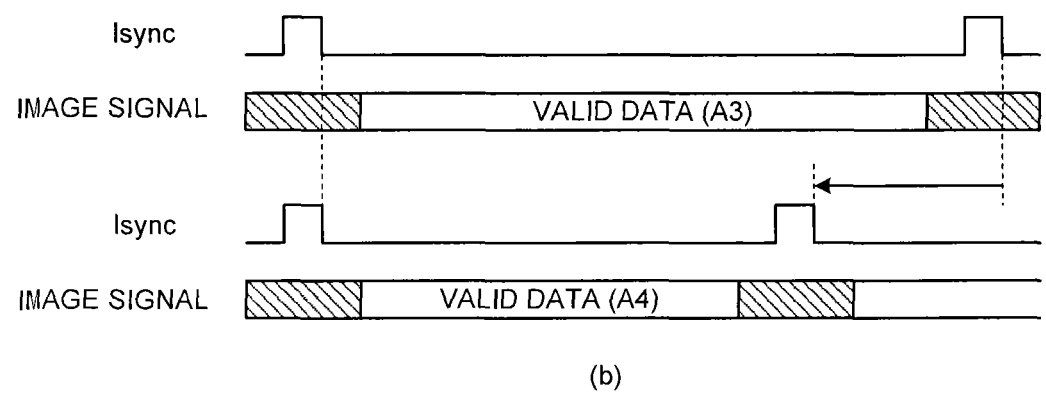
(b)

US 9,503,664 B2

PHOTOELECTRIC CONVERSION ELEMENT, IMAGE READING DEVICE, AND IMAGE FORMING APPARATUS

CROSS-REFERENCE TO RELATED APPLICATIONS

The present application claims priority to and incorporates by reference the entire contents of Japanese Patent Application No. 2013-007795 filed in Japan on Jan. 18, 2013.

BACKGROUND OF THE INVENTION

1. Field of the Invention

The present invention relates to a photoelectric conversion element, an image reading device, and an image forming apparatus.

2. Description of the Related Art

Image reading devices that read a document, for example, perform photoelectric conversion on light reflected from the document, convert analog signals representing images into digital signals, and correct and transfer the image data. Some conventional image reading devices use a spread spectrum clock generation unit to drive the device in order to solve the problem of EMI (unnecessary radiation). However, using spread spectrum clocks for a CCD or CMOS sensor may cause periodic noise due to spread spectrum.

In order to prevent periodic noise due to spread spectrum, for example, Japanese Laid-open Patent Publication No. 2001-94734 discloses an image reading device in which a timing circuit is separated into an analog clock generation circuit and a digital clock generation circuit, with the analog clock generation circuit using a reference clock from a reference clock oscillator and the digital clock generation circuit using a spread spectrum clock from an SSG.

However, when processing speed is increased, reduction of noise due to unnecessary radiation or the like may become insufficient.

In view of the above, there is a need to provide a photoelectric conversion element, an image reading device, and an image forming apparatus that can reduce noise due to unnecessary radiation or the like.

SUMMARY OF THE INVENTION

It is an object of the present invention to at least partially solve the problems in the conventional technology.

A photoelectric conversion element includes: a plurality of AD conversion units that convert respective analog signals representing amounts of charge stored in a plurality of light receiving elements into digital signals in parallel; and a parallel-serial conversion unit that performs parallel-serial conversion on the digital signals into which the analog signals have been converted in parallel by the AD conversion units.

An image reading device includes a photoelectric conversion element as described above.

An image forming apparatus includes: an image reading device as described above; and an image forming unit that forms an image from an image that is read by the image reading device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a diagram of an example of operations of the photoelectric conversion element shown in FIG. 5 and an example of operations of the third modification of the photoelectric conversion element.

DETAILED DESCRIPTION OF THE PREFERRED EMBODIMENTS

Figure 1:
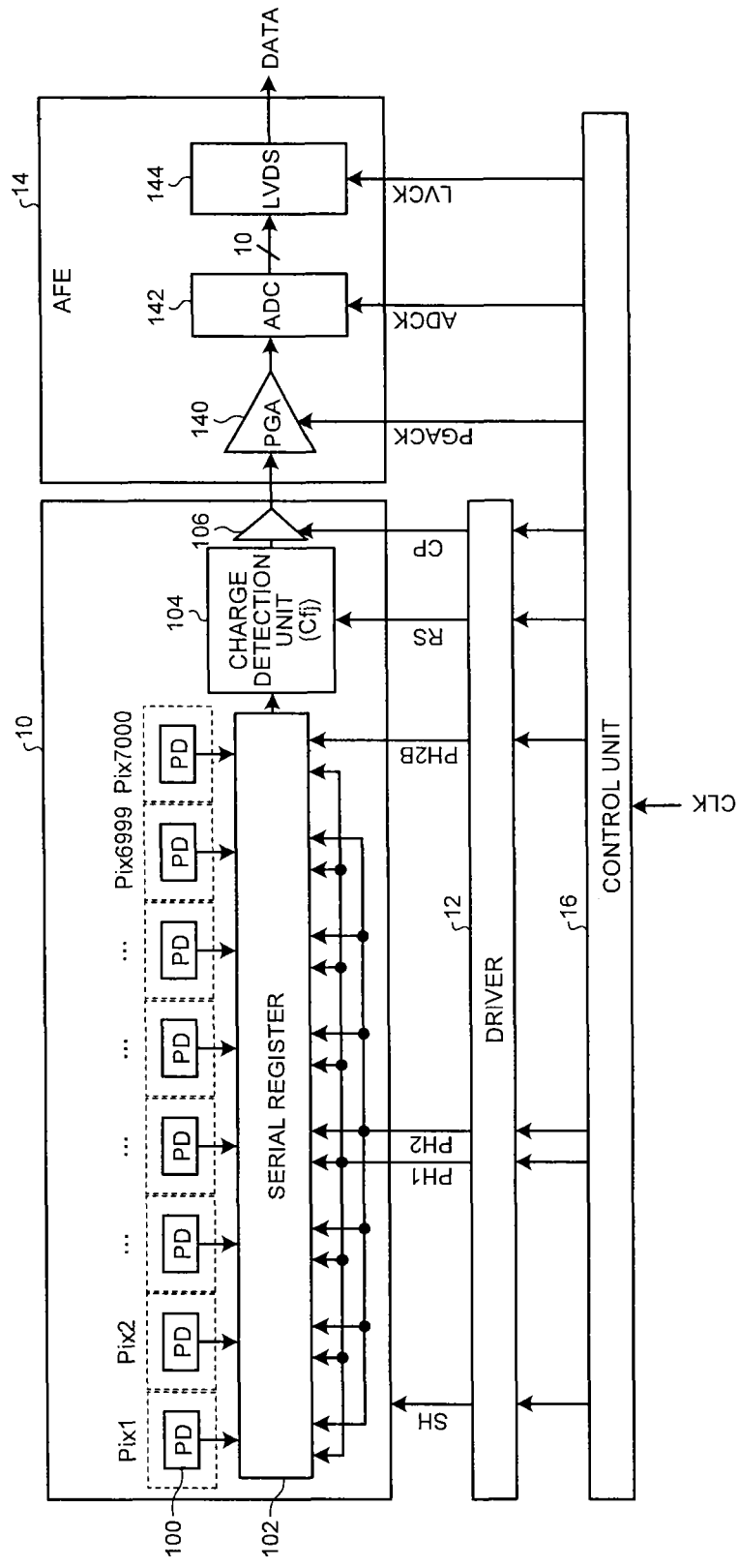
FIG. 1 is a configuration diagram illustrating an outline of an image reading device using a CCD image sensor.

The background of the invention will be described first. FIG. 1 is a configuration diagram illustrating an outline of an image reading device 1 that uses a CCD image sensor. The image reading device 1 includes a photoelectric conversion element 10, a driver 12, an analog front end (AEF) 14, and a timing control unit (timing generator (TG)) 16.

The timing control unit 16 generates CCD drive signals (PH1, PH2, PH2B, RS, CP, SH) by using a reference clock (CLK) and supplies the CCD drive signals to the driver 12. The timing control unit 16 generates AFE drive signals (ADCK, LVCK) by using a reference clock (CLK) and supplies the AFE drive signals to the AFE 14. The amplitude of the drive signals is 3.3 V.

The driver 12 receives the CCD drive signals and performs voltage conversion to convert the amplitude to 5 V to drive the photoelectric conversion element 10.

The photoelectric conversion element 10 is a CCD linear image sensor that is formed by using an NMOS process. The photoelectric conversion element 10 includes, for example, 7000 light receiving elements (photodiode (PD)) 100 that receive light as 7000 unidirectionally-arrayed pixels (Pix1 to Pix 7000). The photoelectric conversion element 10 includes a serial register 102, a charge detection unit (Cfj) 104, and an output buffer 106.

In the photoelectric conversion element 10, each of the light receiving elements 100 stores charge corresponding to incident light and transfers the charge to the serial register 102. The serial register 102 transfers the signal charge of each pixel on a pixel-by-pixel basis to the charge detection unit 104. The charge detection unit 104 converts the transferred charge (amount of charge) to a voltage and outputs the voltage to the output buffer 106. The output buffer 106 outputs the voltage, which is received from the charge detection unit 104, to the AFE 14 as an analog signal.

The AFE 14 includes an amplification unit (programmable gain amplifier (PGA)) 140, an AD conversion unit (ADC) 142, and a low voltage differential signaling (LVDS) 144. The amplification unit 140 amplifies the analog signal, which is output from the photoelectric conversion element 10, and outputs the analog signal to the AD conversion unit 142. The AD conversion unit 142 converts the analog signal, which is received from the amplification unit 140, to a 10-bit digital signal and outputs the digital signal to the LVDS 144. The LVDS 144 transfers the digital signal (image data) to an image processing unit (not shown) by using a differential signal.

Because the LVDS 144 operates at high speed, unnecessary radiation (EMI) may become a problem in the image reading device 1. In order to reduce unnecessary radiation, the image reading device 1 uses, for example, a spread spectrum clock (SSC) for the reference clock (CLK). In this case, CCD drive signals are also generated by using the spread spectrum clock and thus the timing with which the photoelectric conversion element is driven may vary periodically, thus varying the image signal level. This may lead to a problem in that stripes occur periodically in the image.

There is a known technique that corrects such stripes caused by a spread spectrum clock and this solves the problem of the occurrence of stripes in an image. As described above, a technique is also known in which an analog area (PDs to an ADC) that causes an image stripe is driven by using a non-spread spectrum clock and in which a digital area (the stage following an ADC, which is the LVDS 144 in FIG. 1) that is the main cause of unnecessary radiation is driven by a spread spectrum clock.

However, the technique for correcting stripes caused by a spread spectrum clock may not be able to perfectly correct the stripes. Furthermore, in the above technique where the spread spectrum clock and non-spread spectrum clock are selectively used, reduction of noise due to the spread spectrum may be insufficient because a spread spectrum clock is not used to drive the CCD and thus unnecessary radiation caused by driving the CCD cannot be reduced. In other words, unnecessary radiation occurs because the CCD is driven at high speed and the load of driving the shift register that transfers charge is large.

Figure 2:
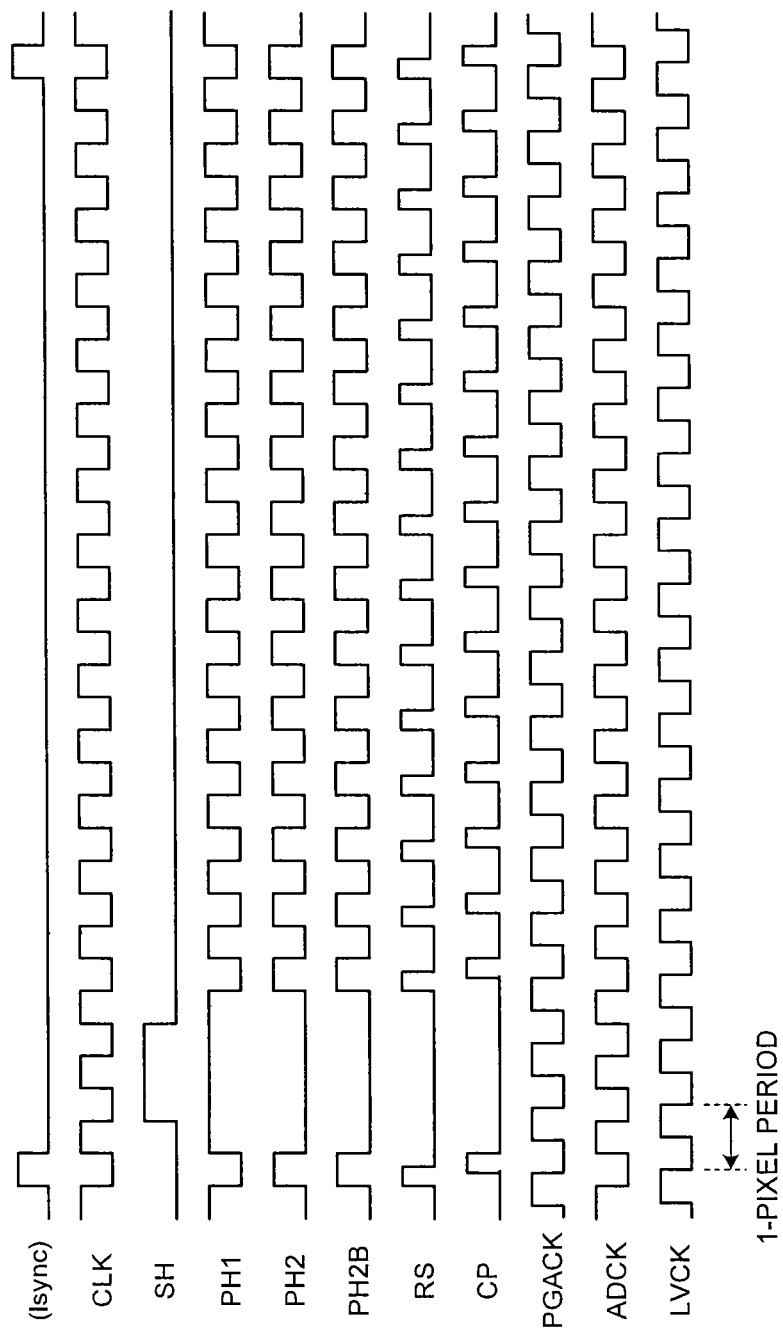
FIG. 2 is a timing chart showing the operation timing of the image reading device shown in FIG. 1.

FIG. 2 is a timing chart showing the operation timing of the image reading device 1 shown in FIG. 1. As described above, the timing control unit 16 generates CCD drive signals using a reference clock (CLK).

First, the timing control unit 16 turns on SH before starting the line reading and transfers the charge stored in the light receiving elements 100 to the serial register 102. The serial register 102 transfers, in response to PH1 and PH2, the transferred charge on a pixel-by-pixel basis to the next stage. The serial register 102 then transfers the charge to the charge detection unit 104 in response to PH2B.

The charge detection unit 104 converts the transferred charge to a voltage. The output buffer 106 externally outputs the image signal that has been converted into voltage. RS is a signal for resetting the charge of the last pixel before the charge is transferred to the charge detection unit 104. CP is a signal for setting the signal level that has been reset to a given reference voltage.

lsync is a line synchronizing signal and represents a period of 1-line in the main-scanning direction of the image reading device 1. The light receiving elements 100 store charge during the 1-line period and the timing for starting to store charge is the same for all pixels (global shutter).

PGACK, ADCK and LVCK are clocks for driving the amplification unit 140, the AD conversion unit 142, and the LVDS 144, respectively. The AFE 14 sequentially converts the analog signal (pixel data) output from the photoelectric conversion element 10 to a digital signal and outputs the digital signal to the latter stage as a high-speed serial signal.

The operations shown in FIG. 2 are performed until, at least, all the pixels (A3 size: about 7000 pixels) are output and PH1, PH2, PH2B, RS, and CP are, for example, between a few megahertz and few tens of megahertz). Because the load of driving the serial register 102 is large, PH1 and PH2 have large current variations. In other words, EMI resulting from the current variations becomes a problem.

Figure 3:
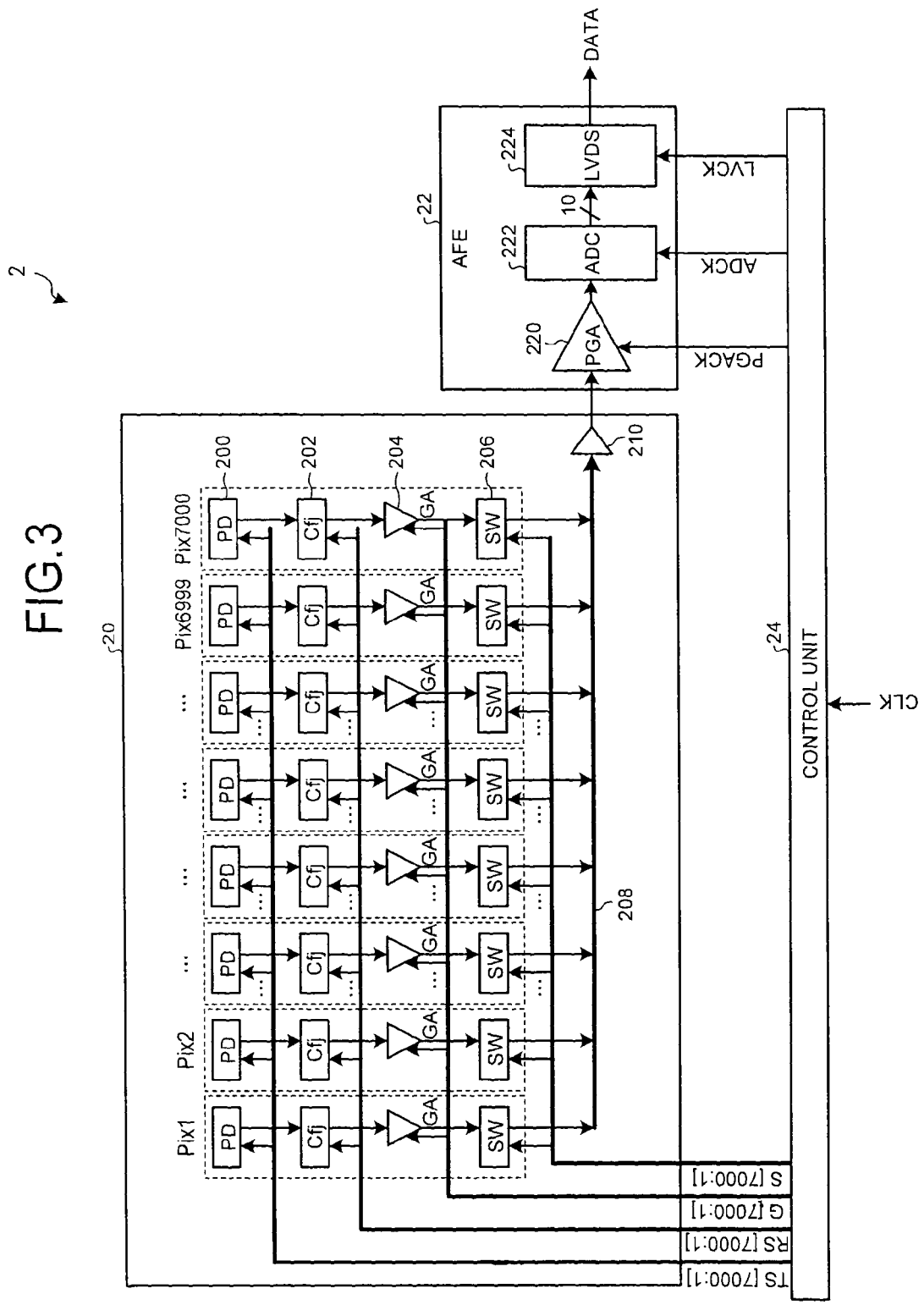
FIG. 3 is a configuration diagram illustrating an outline of an image reading device that uses a CMOS image sensor.

An image reading device 2 using a CMOS image sensor will be described here. FIG. 3 is a configuration diagram illustrating an outline of the image reading device 2 using a CMOS image sensor. The image reading device 2 includes a photoelectric conversion element 20, an analog front end (AFE) 22, and a timing control unit (timing generator (TG)) 24.

The timing control unit 24 generates drive signals (TS, RS, G, S) by using a reference clock (CLK) and supplies the drive signals to the photoelectric conversion element 20. The timing control unit 24 also uses the reference clock (CLK) to generate AFE drive signals (PGACK, ADCK, LVCK) and transmits the AFE drive signals to the AFE 22.

The photoelectric conversion element 20 is a CMOS linear image sensor that includes a light receiving element (photodiode (PD)) 200 that receives light, a charge detection unit (Cfj) 202, an amplification unit (gain amplifier (GA)) 204, and a switch (SW) 206 for each of, for example, 7000 unidirectionally-arrayed pixels (Pix1 to Pix7000). In other words, the photoelectric conversion element 20 includes 7000 light receiving elements 200, 7000 charge detection units 202, 7000 amplification units 204, and 7000 switches 206. The photoelectric conversion element 20 further includes an analog bus 208 and an output buffer 210.

In the photoelectric conversion element 20, each of the light receiving elements 200 stores charge corresponding to incident light and transfers the charge to the charge detection unit 202. The charge detection unit 202 converts the transferred charge (amount of charge) to a voltage and outputs the voltage to the amplification unit 204. The amplification unit 204 amplifies the voltage (analog signal) and outputs the voltage to the switch 206.

Each of the 7000 switches 206 operates in sequence under the control of the timing control unit 24 to output the voltage (analog signal) to the output buffer 210 via the analog bus 208. The drive signals (S[n]) for driving the switches 206 are signals that are turned on once on a pixel-by-pixel basis in the period of processing one line. However, switches 206 for multiple pixels cannot be simultaneously turned on, i.e., the timings at which the switches 206 are turned on differ slightly between pixels.

In other words, the signals (S [7000:1]) for driving the 7000 switches 206 are signals that are asserted once on a pixel-by-pixel basis during a period of processing one line and the number of drive signals is equal to the number of pixels. Similarly, signals (TS [7000:1]) for transferring charge stored in the light receiving elements 200 to the charge detection units 202, signals (RS [7000:1]) for resetting the charge detection units 202, and signals (G [7000:1]) for driving the amplification units 204 are asserted once on a pixel-by-pixel basis during a period of processing one line, and the number of drive signals is equal to the number of pixels.

The output buffer 210 outputs, to the AFE 22, the voltage received via the analog bus 208 on a pixel-by-pixel basis as an analog signal.

The AFE 22 includes an amplification unit (programmable gain amplifier (PGA)) 220, an AD conversion unit (ADC) 222, and a low voltage differential signaling (LVDS) 224. The amplification unit 220 amplifies the analog signal output by the photoelectric conversion element 20 and outputs the analog signal to the AD conversion unit 222. The AD conversion unit 222 converts the analog signal received from the amplification unit 220 to a 10-bit digital signal and outputs the digital signal to the LVDS 224. The LVDS 224 transfers the digital signal (image data) to an image processing unit (not shown) by using a differential signal.

In the image reading device 2 using a CMOS image sensor, EMI becomes a problem as in the image reading device 1 using a CCD. For example, in a CMOS image sensor, driving a switch and an analog bus that have a relatively large load at high speed may cause unnecessary radiation. For the image reading device 2, if, for example, a spread spectrum clock (SSC) is used for the reference clock (CLK), stripes in the image periodically occur due to the spread spectrum clock because the analog area (PDs to an ADC) are driven at high speed (driven at the pixel frequency).

Normally, the load of a CMOS image sensor switch is smaller than that of a CCD shift register switch. However, a CMOS image sensor tends to include a large-size switch in order to reduce signal degradation due to high-speed drive (ensure the circuit is high-speed). Because the wide width of the analog bus is ensured in a CMOS image sensor, the parasitic capacitance increases, which also inevitably increases the load.

Figure 4:
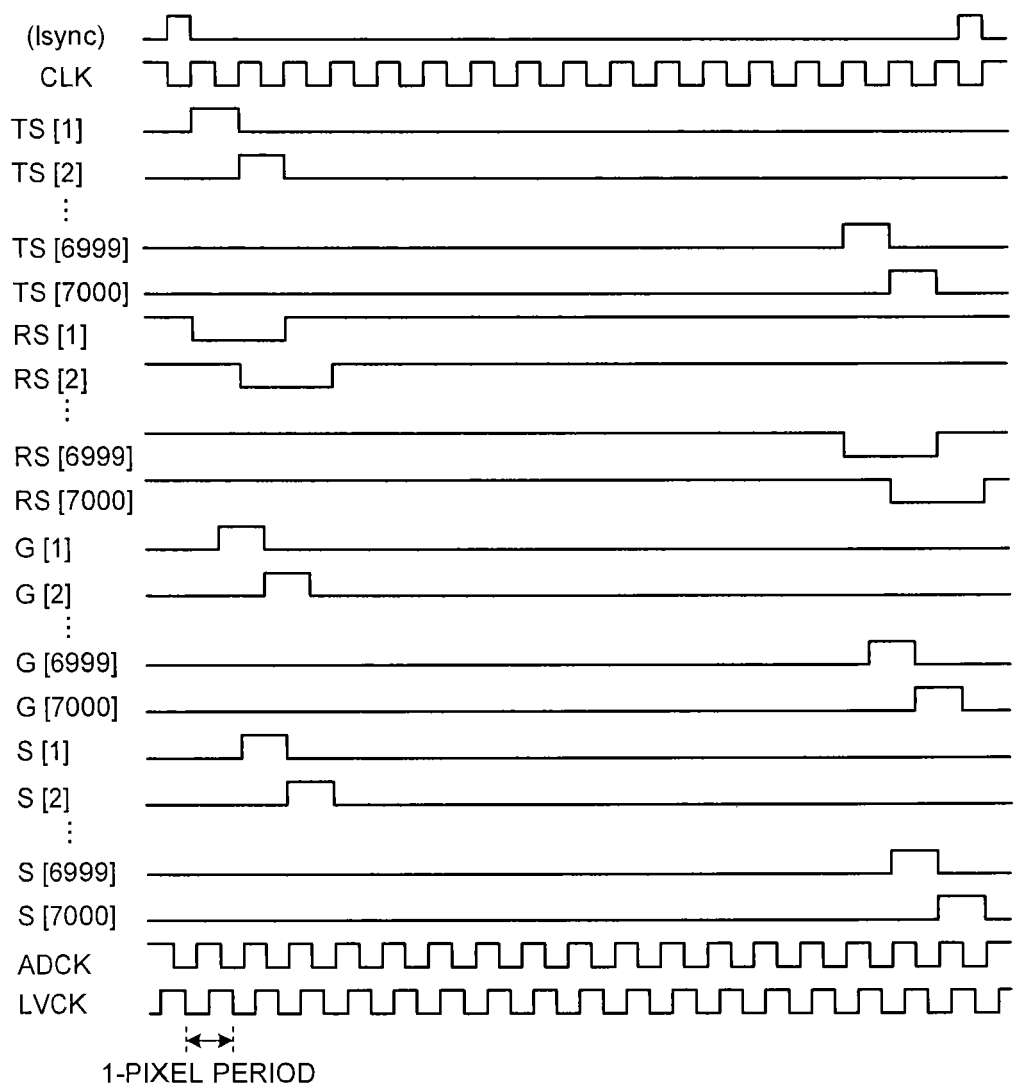
FIG. 4 is a timing chart showing the operation timing of the image reading device shown in FIG. 3.

FIG. 4 is a timing chart representing operation timing of the image reading device 2 shown in FIG. 3. As described above, the timing control unit 24 uses the reference clock (CLK) to generate drive signals.

First, the timing control unit 24 turns off the RS before starting line reading. The RS is a signal for resetting the charge of the charge detection unit 202. The timing control unit 24 holds the charge detection units 202 in a reset state at a normal time but cancels the reset state during the time period when a pixel signal is being read.

After canceling the reset state of the charge detection units 202, the timing control unit 24 turns on the charge transfer signal (TS) to transfer the charge from the light receiving element 200 to the charge detection unit 202. The charge detection unit 202 converts the transferred charge (amount of charge) into a voltage.

The timing control unit 24 then turns on the amplification control signal (G) to cause the amplification unit 204 to amplify the analog signal that is converted to the voltage. The timing control unit 24 then turns on the switch control signal (S) to cause the analog signal (pixel data) to be output to the analog bus 208.

The analog bus 208 is a bus to which the outputs of all pixels are connected and, at a certain timing, only the output of one arbitrary pixel is connected and the switches 206 do not connect the outputs of other pixels to the analog bus 208. In this manner, the analog signals of all the pixels are all output to the output buffer 210 via the analog bus 208. The output buffer 210 outputs the analog signals received via the analog bus 208 on a pixel-by-pixel basis to the AFE 22.

The timing control unit 24 then turns off the switch control signal (S) to close the switch 206 and performs processing for the next pixel. The timing control unit 24 performs the series of processes until the pixels of all pixels are output. In other words, TS[n], RS[n], G[n], and S[n] (n is a value from 1 to 7000) are shifted by a one-pixel period and the above series of operations is performed about 7000 times.

lsync is a line synchronizing signal and represents a period of 1-line in the main-scanning direction of the image reading device 2. PGACK, ADCK and LVCK are clocks for driving the amplification unit 220, the AD conversion unit 222 and the LVDS 224, respectively. The AFE 22 sequentially converts the analog signal (pixel data) output from the photoelectric conversion element 20 to digital signal and outputs the digital signal to the latter stage as a high-speed serial signal.

Because the operations of 1 to 7000 pixels shown in FIG. 4 are each performed once for one line, the drive load per pixel is smaller than that of a CCD image sensor. However, operations of all pixels are performed on a pixel-by-pixel basis in 1-line operation and this is equivalent to driving pixels at a pixel frequency of a few megahertz to few tens of megahertz in the whole of the photoelectric conversion element 20. In other words, while a CCD image sensor drives 7000 pixels in response to a clock of a pixel frequency, a CMOS sensor drives the operation for one clock of pixel frequency for 7000 times (drives in response to 7000 signals).

Embodiment

Figure 5:
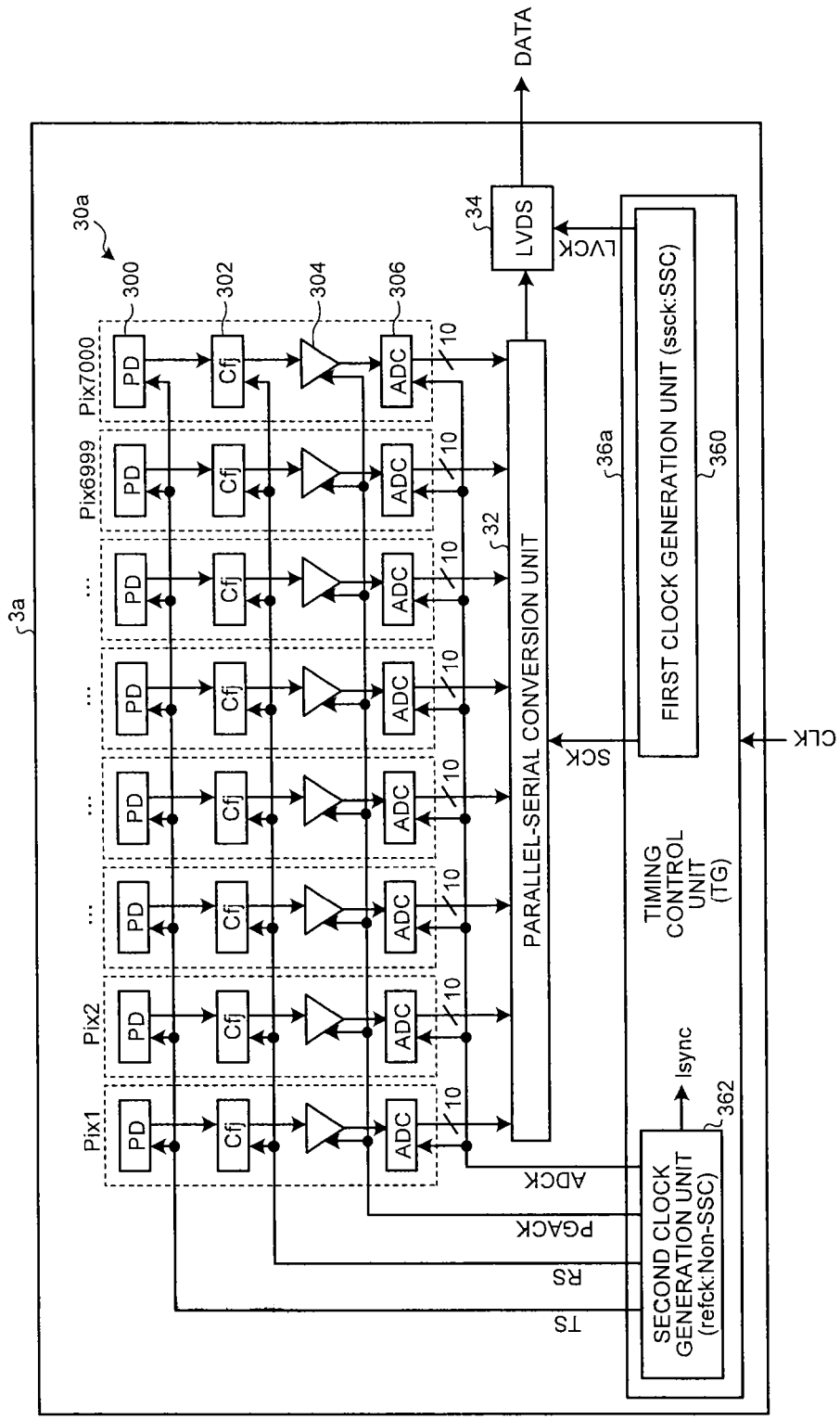
FIG. 5 is a configuration diagram of a photoelectric conversion element according to an embodiment.

A photoelectric conversion element of an embodiment will be described here. FIG. 5 is a configuration diagram of a photoelectric conversion element 3a according to the embodiment. The photoelectric conversion element 3a is a CMOS linear image sensor that includes an analog processing unit 30a, a parallel-serial conversion unit 32, a low voltage differential signaling (LVDS) 34, and a timing control unit (timing generator (TG)) 36a.

The timing control unit 36a includes a first clock generation unit 360 and a second clock generation unit 362. The first clock generation unit 360 generates drive signals (SCK, LVCK) that are based on the spread spectrum clock (SSC) by using a reference clock (CLK). The first clock generation unit 360 drives the parallel-serial conversion unit 32 by using the drive signal SCK and drives the LVDS 34 by using the drive signal LVCK.

The second clock generation unit 362 generates drive signals (TS, RS, PGACK, ADCK) that are based on the non-Spread spectrum clock (Non-SSC), and a line synchronizing signal (lsync). The second clock generation unit 362 drives the analog processing unit 30a by using the drive signals (TS, RS, PGACK, ADCK). The second clock generation unit 362 further supplies the line synchronizing signal (lsync) to an image processing unit of an image reading device (not shown) and so on. The second clock generation unit 362 generates the drive signals (TS, RS, PGACK, ADCK) in synchronization with the line synchronizing signal (lsync).

The analog processing unit 30a includes a light receiving element (a photodiode (PD)) 300 that receives light, a charge detection unit (Cfj) 302, an amplification unit (programmable gain amplifier (PGA)) 304, and an AD conversion unit 306 for each of, for example, 7000 unidirectionally-arrayed pixels (Pix1 to Pix7000). In other words, the photoelectric conversion element 3a includes 7000 light receiving elements 300, 7000 charge detection units 302, 7000 amplification units 304, and 7000 AD conversion units 306.

In the photoelectric conversion element 3a, each of the light receiving elements 300 stores charge corresponding to incident light and transfers the charge to the charge detection unit 302. The charge detection unit 302 converts the transferred charge (amount of charge) to a voltage and outputs the voltage to the amplification unit 304. The amplification unit 304 amplifies the voltage (analog signal) and outputs the voltage to the AD conversion unit 306. The AD conversion unit 306 converts the analog signal that is pixel data received from the amplification unit 304 into a 10-bit digital signal and outputs the 10-bit digital signal to the parallel-serial conversion unit 32.

The parallel-serial conversion unit 32 converts the digital signals that are output by, for example, 7000 AD conversion units 306 from parallel data to serial data and outputs each pixel data that has been converted into serial data to the LVDS 34. The parallel-serial conversion unit 32 includes, for example, a memory and performs frequency conversion. In other words, the parallel-serial conversion unit 32 outputs serial data in synchronization with the drive signal SCK with a period shorter than the period of receiving 10-bit digital data from the conversion units 306.

The LVDS 34 externally outputs the digital data received from the parallel-serial conversion unit 32 by using a differential signal.

As described above, the photoelectric conversion element 3a includes the light receiving element 300, the charge detection unit 302, the amplification unit 304, and the AD conversion unit 306 on a pixel-by-pixel basis and performs processes from light receiving to AD conversion on all pixels in parallel. Thus, the processes that are performed by the photoelectric conversion element 10 (see FIG. 1) or the photoelectric conversion element 20 (see FIG. 3) at an operation frequency of a few megahertz to a few tens of megahertz can be performed by the photoelectric conversion element 3a at a few kilohertz to a few tens of kilohertz (approximately $\frac{1}{1000}$).

Generally, the frequency band where noise occurs due to unnecessary radiation or the like is a few megahertz to a few gigahertz, and thus harmonics with a frequency of a few multiples to a few multiples of tens of the fundamental frequency cause a problem. The photoelectric conversion element 3a significantly reduces the occurrence of noise due to unnecessary radiation or the like by using a frequency of a few kilohertz to few tens of kilohertz as the fundamental frequency of the analog processing unit 30a. Because the photoelectric conversion element 3a supplies no spread spectrum clock to the analog processing unit 30a, occurrence of periodic noise in the read image can be reduced.

The parallel-serial conversion unit 32 converts image data that is output from each AD conversion unit 306 in parallel, into serial data and outputs the serial data to the LVDS 34. In other words, the parallel-serial conversion unit 32 and the LVDS 34 operate at the same pixel frequency as that of the photoelectric conversion element 10 (see FIG. 1) and the photoelectric conversion element 20 (see FIG. 3). However, the parallel-serial conversion unit 32 and the LVDS 34 are driven in response to drive signals (SCK, LVCK) that are based on the spread spectrum clock, which reduces occurrence of noise due to unnecessary radiation or the like.

The photoelectric conversion element 3a may be provided with analog processing units 30a, parallel-serial conversion units 32, and LVDs 34 for respective colors of light, such as R, G, and B. In other words, the photoelectric conversion element 3a may be configured to simultaneously process 21000 pixels (7000 pixels×3 colors) in parallel.

The photoelectric conversion element 3a may be, for example, provided with one amplification unit 304 and one AD conversion unit 306 for every two pixels of the same color and may be configured to simultaneously process 10500 pixels (3500 pixels×3 colors) in parallel. The photoelectric conversion element 3a may be provided with one amplification unit 304 and one AD conversion unit 306 for every 3 pixels each one of which is of one of different colors (e.g., R, G, B) and may be configured to simultaneously process 7000 pixels (7000 pixels×1).

The photoelectric conversion element 3a uses drive signals (TS, RS, PGACK, ADCK) that are commonly used for each pixel in order to perform simultaneous parallel processing on each pixel. In other words, the photoelectric conversion element 3a is not required to use drive signals equal in number (7000) to drive signals (TS, RS, G, S) to drive the photoelectric conversion element 20 (see FIG. 3) and one signal is used for each drive signal, which reduces the circuit scale.

As described above, the second clock generation unit 362 generates drive signals (TS, RS, PGACK, ADCK) that are based on a non-spread spectrum clock in synchronization with the line synchronizing signal (lsync). Each of the light receiving elements 300 starts to store charge in synchronization with the line synchronizing signal. In the image reading device that reads an image by using the line synchronizing signal (lsync) that is output by the photoelectric conversion element 3a, the timing of starting to read an image in the sub-scanning direction is synchronized with the operation of the analog processing unit 30a. Accordingly, the time for which the analog processing unit 30a stores the charge and the timing at which the analog processing unit 30a starts to read an image are not affected by spread spectrum. In other words, the photoelectric conversion element 3a can reduce the line variation where the image level varies between lines and reduce deviation in line synchronization.

Figure 6:
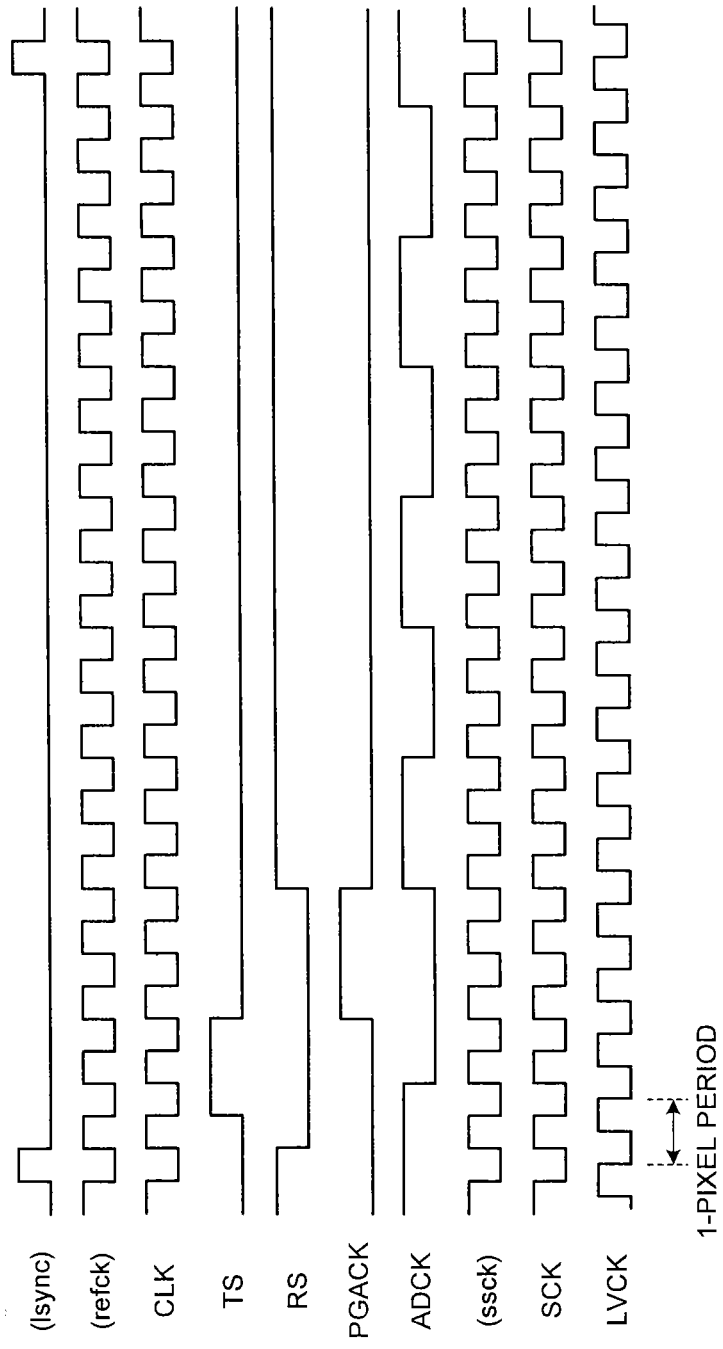
FIG. 6 is a timing chart showing the operation timing of the photoelectric conversion element.

FIG. 6 is a timing chart representing operation timings of the photoelectric conversion element 3a. As describe above, by using a reference clock (CLK), the timing control unit 36a generates drive signals (SCK, LVCK) that are based on the spread spectrum clock, drive signals (TS, RS, PGACK, ADCK) that are based on the non-spread spectrum clock, and a line synchronizing signal (lsync).

The photoelectric conversion element 3a simultaneously processes all pixels according to the drive signals (TS, RS, PGACK, ADCK). First, the timing control unit 36a turns off RS before line reading is started. RS is a signal for resetting the charge of the charge detection unit 302. The timing control unit 36a holds the charge detection unit 302 in a reset state at a normal time and cancels the reset state during a pixel signal reading period.

After cancelling the reset state of the charge detection unit 302, the timing control unit 36a turns on the charge transfer signal (TS) to transfer the charge from the light receiving element 300 to the charge detection unit 302. The charge detection unit 302 converts the transferred charge (amount of charge) into a voltage.

The timing control unit 36a turns on PGACK in order to cause the amplification unit 304 to amplify the analog signal that has been converted into a voltage. The timing control unit 36a turns on ADCK in order to cause the AD conversion unit 306 to convert the analog signal (pixel data) into a digital signal. Because the AD conversion unit 306 converts an analog signal into a 10-bit digital signal, a clock that turns on approximately 10 times during 1-line period is used for ADCK.

The parallel-serial conversion unit 32 stores data of each of all the pixels that have been converted into digital data by each AD conversion unit 306, in the memory (not shown). The parallel-serial conversion unit 32 sequentially outputs the all-pixel data, which is stored in the memory, to the LVDS 34 in synchronization with a serialization clock (SCK). The LVDS 34 outputs the all-pixel data that has been converted into serial data in synchronization with LVCK.

The first clock generation unit 360 first generates, for example, a spread spectrum reference clock (ssck) and uses the spread spectrum reference clock (ssck) to generate drive signals (SCK, LVCK). The second clock generation unit 362 first generates a non-spread spectrum reference clock (refck) and uses the non-spread spectrum reference clock (refck) to generate drive signals (TS, RS, PGACK, ADCK) and a line synchronizing signal (lsync).

As described above, the drive signals (TS, RS, PGACK, ADCK) for driving the analog processing unit 30a are signals that are turned on once (ADCK is turned on about 10 times) in every one line and are at a low frequency band of a few kilohertz to a few tens of kilohertz.

As described above, in the photoelectric conversion element 3a, the analog processing units 30a performs processes in parallel, which reduces the drive frequency of the analog processing units 30a and thus reduces noise due to unnecessary radiation or the like. In the photoelectric conversion element 3a, the analog processing units 30a are driven by the non-spread spectrum clock with reduced drive frequency, which reduces the occurrence of periodic stripes caused by spread spectrum. In the photoelectric conversion element 3a, the parallel-serial conversion unit 32 and the LVDS 34 are driven in response to the spread spectrum clock, which reduces noise due to unnecessary radiation or the like.

First Modification

Figure 7:
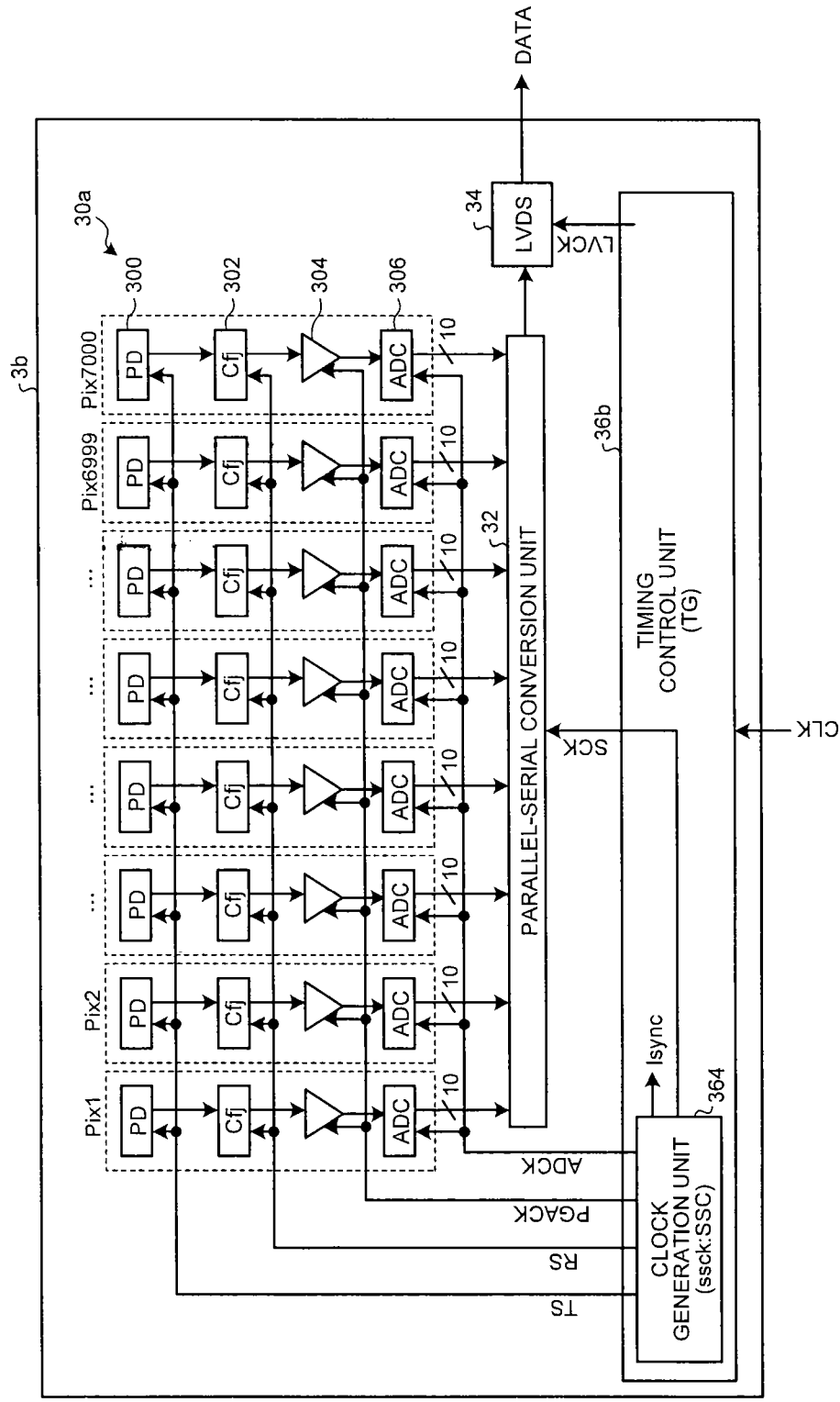
FIG. 7 is a configuration diagram of a first modification of the photoelectric conversion element.

A first modification of the photoelectric conversion element 3a will be described here. FIG. 7 is a configuration diagram of the first modification (a photoelectric conversion element 3b) of the photoelectric conversion element 3a. Components of the photoelectric conversion element 3b shown in FIG. 7 that are substantially the same as those of the photoelectric conversion element 3a shown in FIG. 5 are denoted by the same reference numerals as those for the components of the photoelectric conversion element 3a.

The photoelectric conversion element 3b is a CMOS linear image sensor including the analog processing unit 30a, the parallel-serial conversion unit 32, a LVDS 34, and a timing control unit (timing generator (TG)) 36b.

The timing control unit 36b includes a clock generation unit 364. By using a reference clock (CLK), the clock generation unit 364 generates drive signal (TS, RS, PGACK, ADCK, SCK, LVCK) that are based on the spread spectrum clock, and a line synchronizing signal (lsync). The clock generation unit 364 drives the analog processing unit 30a in response to TS, RS, PGACK, and ADCK, drives the parallel-serial conversion unit 32 in response to SCK and, drives the LVDS 34 in response to LVCK. The clock generation unit 364 supplies the line synchronizing signal (lsync) to an image processing unit of an image reading device (not shown) and so on. The clock generation unit 364 first generates, for example, a spread spectrum reference clock (ssck) and uses the reference clock (ssck) to generate a line synchronizing signal. The clock generation unit 364 generates drive signals (TS, RS, PGACK, ADCK) in synchronization with the line synchronizing signal (lsync).

The frequency of TS, RS, PGACK, and ADCK is lower than that of SCK and LVCK as in the case of the timing control unit 36a. Because the frequency of TS, RS, PGACK, and ADCK is reduced, the operation timing margin of the light receiving elements 300, the charge detection units 302, the amplification units 304, and the AD conversion units 306 significantly improves.

In the photoelectric conversion element 3b, the operation frequency of the analog processing unit 30a is reduced, which reduces the effect of timing variation of the analog processing unit 30a caused by spread spectrum that causes a problem if the operation frequency is high. In other words, if stripes that periodically occur in a read image resulting from the timing variation due to spread spectrum are reduced to an allowable level, it is not always necessary to drive the analog processing unit 30a in response to non-spread spectrum clocks.

In other words, the photoelectric conversion element 3b does not include the second clock generation unit 362 of the photoelectric conversion element 3a that generates the non-spread spectrum clock, thereby having a circuit scale smaller than that of the photoelectric conversion element 3a.

Figure 8:
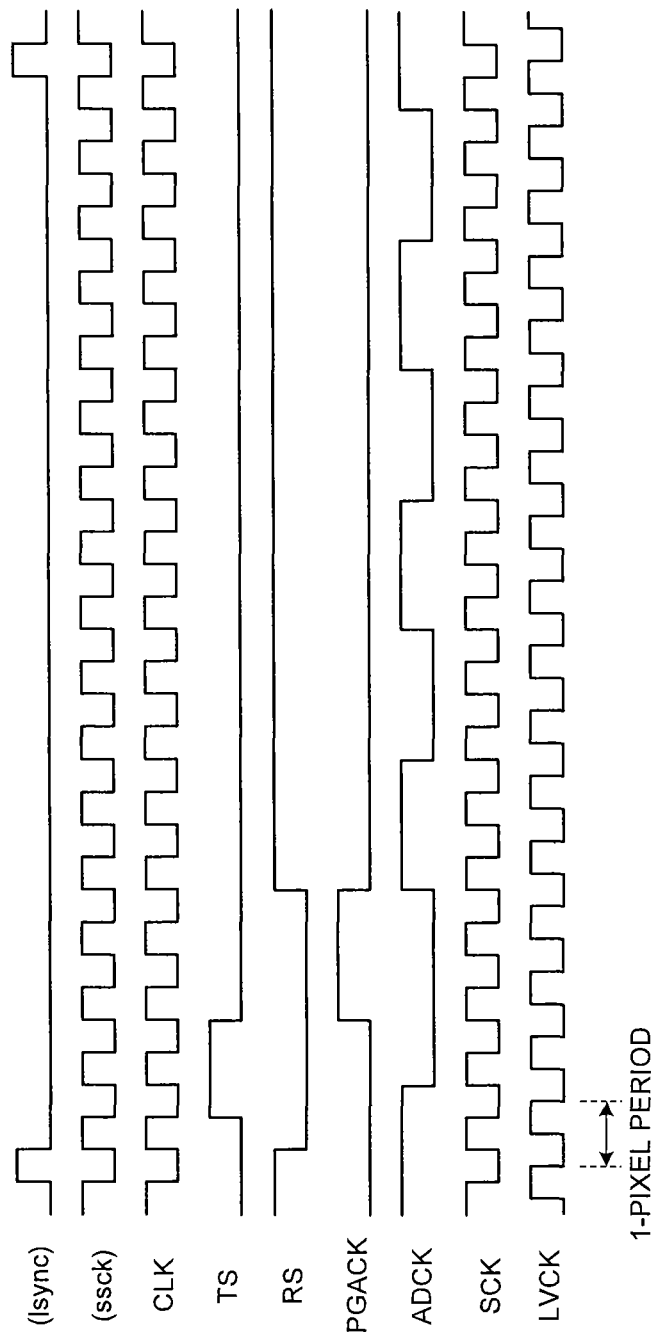
FIG. 8 is a timing chart showing the operation timing of the photoelectric conversion element of the first modification.

FIG. 8 is a timing chart showing operation timing of the first modification (photoelectric conversion element 3b) of the photoelectric conversion element 3a. As shown in FIG. 8, the photoelectric conversion element 3b is different from the photoelectric conversion element 3a in that the photoelectric conversion element 3b does not use a non-spread spectrum clock and operates in synchronization with a spread spectrum reference clock (ssck).

(Second Modification)

Figure 9:
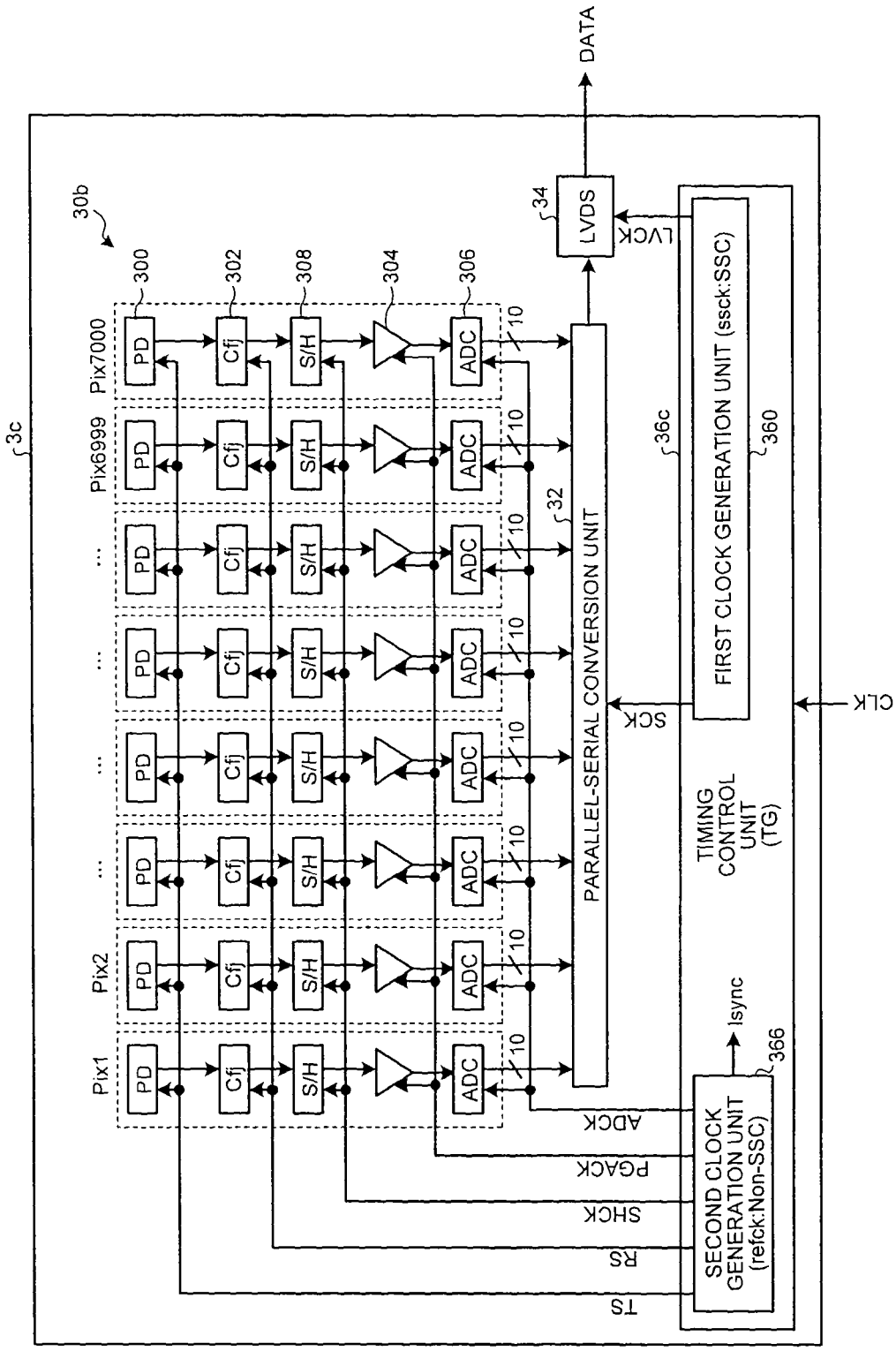
FIG. 9 is a configuration diagram of a second modification of the photoelectric conversion element.

A second modification of the photoelectric conversion element 3a will be described. FIG. 9 is a configuration diagram of the second modification (a photoelectric conversion element 3c) of the photoelectric conversion element 3a. Components of the photoelectric conversion element 3c shown in FIG. 9 that are substantially the same as those of the photoelectric conversion element 3a shown in FIG. 5 are denoted by the same reference numerals as those for the components of the photoelectric conversion element 3a.

The photoelectric conversion element 3c is a CMOS linear image sensor that includes an analog processing unit 30b, the parallel-serial conversion unit 32, the LVDS 34, and a timing control unit (timing generator (TG)) 36c.

The timing control unit 36c includes the first clock generation unit 360 and a second clock generation unit 366. By using a reference clock (CLK), the second clock generation unit 366 generates drive signal (TS, RS, SHCK, PGACK, ADCK) that are based on the spread spectrum clock, and a line synchronizing signal (lsync). The second clock generation unit 366 drives the analog processing unit 30b in response to the drive signals (TS, RS, SHCK, PGACK, ADCK). Further, the second clock generation unit 366 supplies the line synchronizing signal (lsync) to an image processing unit of an image reading device (not shown) and so on. The second clock generation unit 366 generates drive signals (TS, RS, SHCK, PGACK, ADCK) in synchronization with the line synchronizing signal (lsync).

The analog processing unit 30b includes the light receiving element (photodiodes (PD)) 300 that receives light, the charge detection unit (Cfj) 302, a sample and hold circuit (signal holding unit 308), the amplification unit (gain amplifier (GA)) 304, and the AD conversion unit 306 for each of, for example, unidirectionally-arrayed 7000 pixels (Pix1 to Pix7000). In other words, the photoelectric conversion element 3b includes 7000 light receiving elements 300, 7000 charge detection units 302, 7000 sample and hold circuits 308, 7000 amplification units 304, and 7000 AD conversion units 306.

The charge detection unit 302 converts the transferred charge (amount of charge) into voltage and outputs the voltage to the sample and hold circuit 308. The sample and hold circuit 308 samples and holds the voltage received from the charge detection unit 302 and outputs the voltage to the amplification unit 304 in response to the drive signal SHCK.

The frequency of TS, RS, SHCK, PGACK, and ADCK is lower than that of SCK and LVCK as in the case of the timing control unit 36a. In the analog processing unit 30b, while the lower operation frequency increases the timing margin, the operating time for data of one pixel is long. For example, when the operating time of image data of one pixel by the photoelectric conversion element 20 is of nanosecond order, the operating time by the analog processing unit 30b is of microsecond order. Thus, variations in the signal level caused by leak in the analog processing unit 30b may be large. If the signal level variation caused by leak in the analog processing unit 30b becomes large and differs between pixels, occurrence of vertical stripes may be caused in a read image. In other words, the sample and hold circuit 308 prevents the output of the charge detection unit 302 at a low signal level from varying due to leak. In this manner, the photoelectric conversion element 3c can prevent occurrence of vertical stripes due to leak in a read image. The circuit scale of the sample and hold circuit 308 is small, which prevents leak effectively.

The photoelectric conversion element 20 shown in FIG. 3 uses a sequential exposing method (rolling shutter) where the reading timings differ between pixels, which may cause skew in the read image (reading may be obliquely performed in main scanning). The photoelectric conversion element 3c shown in FIG. 9 includes the amplification unit and the AD conversion unit 306 on a pixel-by-pixel basis and thus uses a collective exposing (global shutter) method where all pixels are processed in parallel.

Even if the photoelectric conversion element 3c includes the amplification unit 304 and the AD conversion unit 306 for every set of pixels (e.g., for every set of three pixels each one of which is of one of R, G, and B), the signals from collective exposure can be held because the sample and hold circuit 308 is provided on a pixel-by-pixel basis. Thereafter, in the photoelectric conversion element 3c, the amplification unit 304 and the AD conversion unit 306 that are provided for each set of pixels can sequentially perform the processes. In other words, even if the photoelectric conversion element 3c has a configuration in which the amplification unit 304 and the AD conversion unit 306 are provided for every set of pixels, the global shutter method can be used, which prevents occurrence of skew in a read image.

If the amplification unit 304 has a configuration using the capacity ratio (the method where charge is transferred from a first capacitor to a second capacitor to amplify the voltage), the photoelectric conversion element 3c may use the capacitor and switch of the amplification unit 304 as a sample and hold circuit.

Figure 10:
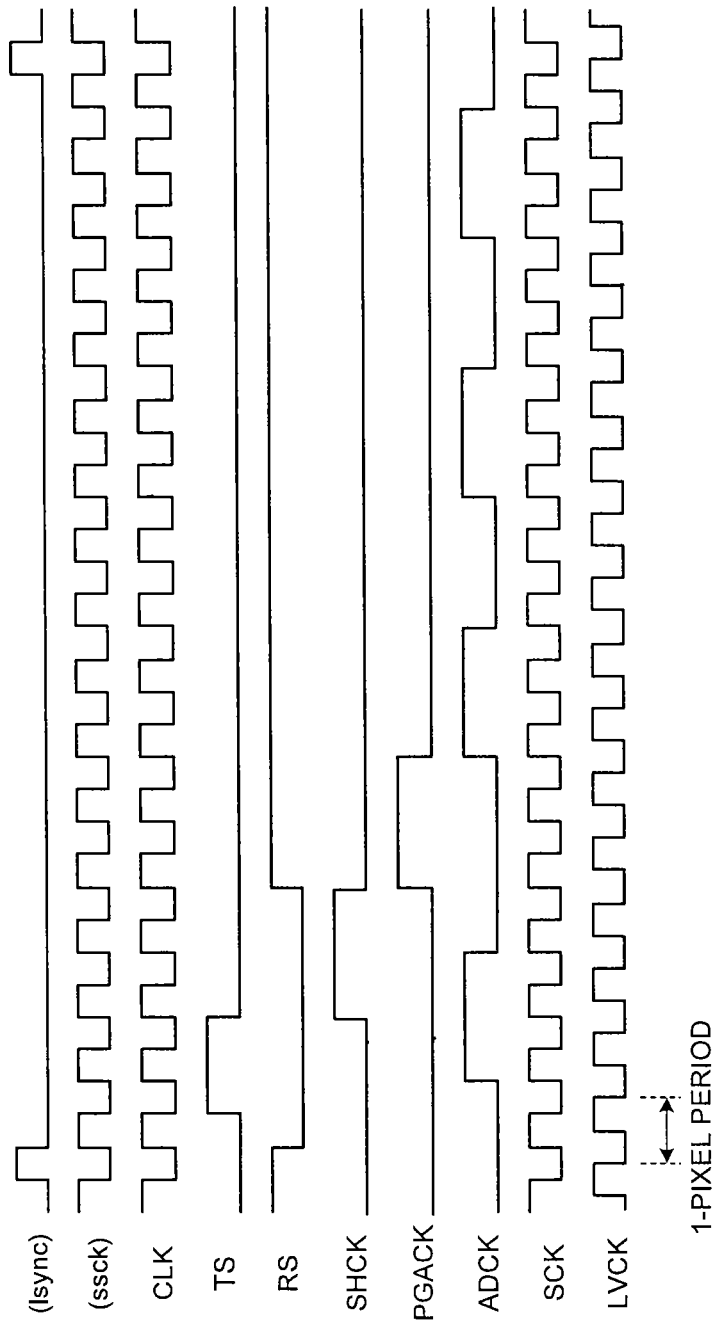
FIG. 10 is a timing chart showing operation timing of the photoelectric conversion element of the second modification.

FIG. 10 is a timing chart showing operation timing of the second modification (the photoelectric conversion element 3c) of the photoelectric conversion element 3a. As shown in FIG. 10, the photoelectric conversion element 3c is different from the photoelectric conversion element 3a in that the drive signal SHCK for driving the sample and hold circuit 308 is provided.

Figure 11:
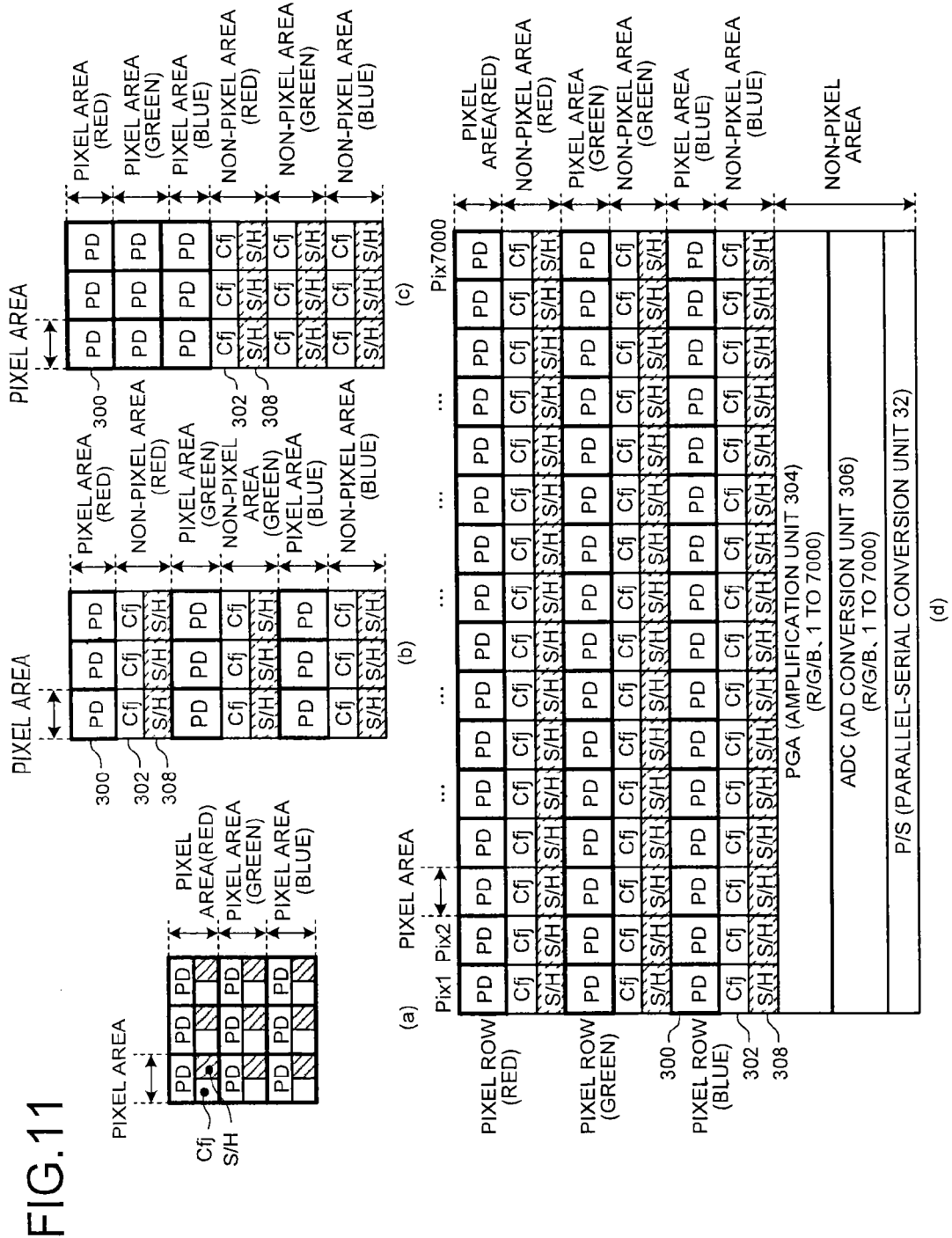
FIG. 11 is a diagram of an example and a comparative example of the arrangement of a sample and hold circuit in the photoelectric conversion element.

The arrangement of the sample and hold circuits 308 in the photoelectric conversion element 3c will be described. FIG. 11 is a diagram of an example and a comparative example of arrangement of the sample and hold circuits 308 in the photoelectric conversion element 3c. The photoelectric conversion element 3c is provided with an analog processing unit 30a, the parallel-serial conversion unit 32, and the LVDS 34 for each light color of R, G, and B.

The sample and hold circuit 308 is configured of a combination of switch, capacitor, amplifier and so on or is configured of a capacitor. In order to reduce a long-period leak in, for example, a few tens of microseconds to few hundreds of microseconds, the sample and hold circuit 308 needs a capacitor corresponding to that period. In other words, the circuit scale of the photoelectric conversion element 3c (FIG. 9) is larger than that of the photoelectric conversion element 3a (FIG. 5).

FIG. 11(a) is a diagram of a comparative example of arrangement of sample and hold circuits in the photoelectric conversion element. As shown in FIG. 11(a), configuring a circuit in addition to a light receiving element, such as a photodiode, in the pixel (pixel area) reduces the photodiode area. For example, arranging a sample and hold circuit in a pixel has to reduce the area of the photodiode, which reduces the aperture ratio. The aperture ratio represents the light detection efficiency and can be determined mainly according to the area of the photodiode. As shown in FIG. 11(a), for example, configuring a charge detection unit (Cfj) and a sample and hold circuit (S/H) in a pixel halves the area of a photodiode in the pixel, i.e., the aperture ratio is halved.

FIG. 11(b) is a diagram of a first example of arrangement of the sample and hold circuits 308 in the photoelectric conversion element 3c. As shown in FIG. 11(b), the photoelectric conversion element 3c provides "non-pixel areas" between the rows of R, G, and B pixel areas, with respect to the "pixel areas" containing the light receiving elements 300, and each charge detection unit 302 and each sample and hold circuit 308 are arranged in one of the non-pixel areas. In other words, the charge detection unit 302 and the sample and hold circuit 308 do not put any effects on the area of the light receiving element 300 and thus the aperture ratio does not lower.

In the photoelectric conversion element 3c, non-pixel areas each having a width corresponding to 1 line are provided between rows of R, G, and B pixel areas, which allows the connection of the charge detection unit 302 and the sample and hold circuit 308 in the minimum distance. Accordingly, the photoelectric conversion element 3c can minimize the effects of noise from the surrounding circuits.

FIG. 11(c) is a diagram of a second example of arrangement of the sample and hold circuits 308 in the photoelectric conversion element 3c. As shown in FIG. 11(c), the photoelectric conversion element 3c may be provided with rows of "pixel areas" (line gapless) where R, G, and B light receiving elements 300 are collectively arranged and rows of "non-pixel areas" where R, G, and B charge detection units 302 and the sample and hold circuits 308 are collectively arranged. Each of the charge detection units 302 and the sample and hold circuits 308 is arranged below (or above) the rows of pixel areas in FIG. 11(c).

FIG. 11(d) is a diagram of an example of arrangement of the amplification unit 304, the AD conversion unit 306, and the parallel-serial conversion unit 32 in the first example of arrangement of the sample and hold circuits 308. As shown in FIG. 11(d), the amplification unit 304, the AD conversion unit 306, and the parallel-serial conversion unit 32 are provided in a "non-pixel area" (on the lower side (or upper side) in FIG. 11) different from the areas of the light receiving element 300, the charge detection unit 302, and the sample and hold circuit 308. The amplification units 304, the AD conversion units 306, and the parallel-serial conversion unit 32 are arranged so as to extend in the same direction as that in which the light receiving element 300 is arrayed for each light color. As described, circuits other than the sample and hold circuits 308 are arranged in positions where they do not block the optical path of light that can be received by the light receiving elements 300, which prevents the aperture ratio of almost all pixels from lowering due to the circuits.

FIG. 11 shows an example where circuits, such as the sample and hold circuits 308, are configured in the same semiconductor layer where the light receiving elements 300 are configured (generally, a semiconductor chip is configured of multiple layers), but this does not limit the configuration. In other words, the sample and hold circuits 308 and so on may be configured in a different layer.

Compared to a linear image sensor, in an area image sensor, pixels have to be two-dimensionally spread and arrayed, which makes it difficult to provide non-pixel areas between pixels regardless of whether in the line direction or the row direction (see FIG. 11(a)). In contrast, the linear image sensor has a configuration in which pixels are arrayed in one direction and thus, while non-pixel areas cannot be provided in the main scanning direction, non-pixel areas can be provided in the sub-scanning direction (the direction of array of rows of R, G and B pixels).

(Third Modification)

Figure 12:
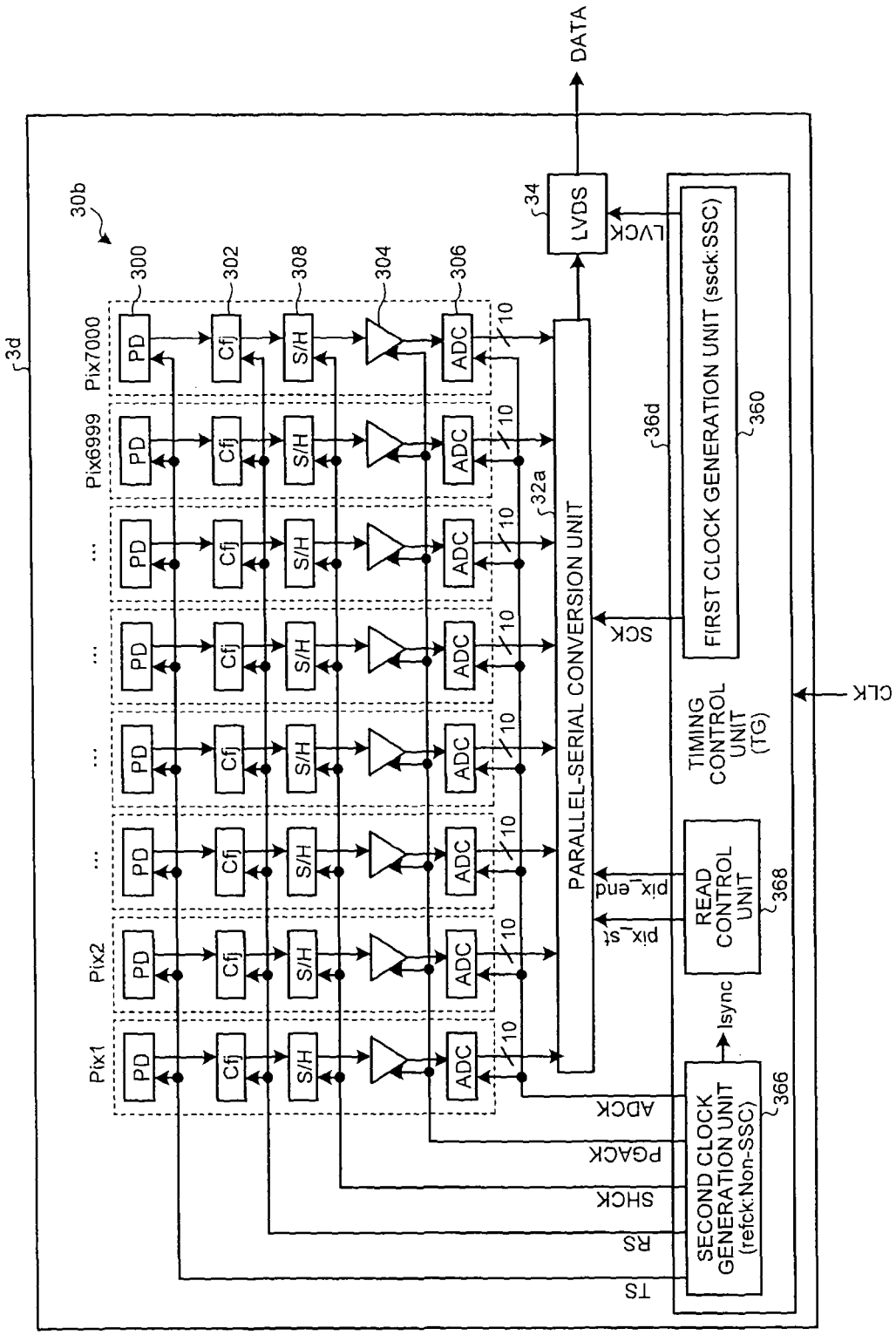
FIG. 12 is a configuration diagram of a third modification of the photoelectric conversion element.

A third modification of the photoelectric conversion element 3a will be described below. FIG. 12 is a configuration diagram of the third modification (a photoelectric conversion element 3d) of the photoelectric conversion element 3a. Components of the photoelectric conversion element 3d shown in FIG. 12 that are substantially the same as those of the photoelectric conversion element 3c shown in FIG. 9 are denoted by the same reference numerals as those for the components of the photoelectric conversion element 3a.

The photoelectric conversion element 3d is a CMOS linear image sensor including the analog processing unit 30b, a parallel-serial conversion unit 32a, the LVDS 34, and a timing control unit (timing generator (TG)) 36d.

The timing control unit 36d includes the first clock generation unit 360, the second clock generation unit 366, and a read control unit 368. The read control unit 368 selects partial pixel data from the pixel data stored by the memory of the parallel-serial conversion unit 32a and causes the parallel-serial conversion unit 32a to output the selected pixel data as serial data. For example, the read control unit 368 outputs, to the parallel-serial conversion unit 32a, a signal (pix_st) representing the start pixel of the area to be read from among 7000 pixels and a signal (pix_end) representing the end pixel of the area to be read.

The parallel-serial conversion unit 32a converts the digital signals of the pixels (area-specified pixels) that are selected by the read control unit 368 from parallel data into serial data and outputs each pixel data, which has been converted into serial data, to the LVDS 34. The parallel-serial conversion unit 32a includes, for example, a memory and performs frequency conversion. In other words, the parallel-serial conversion unit 32a outputs serial data in synchronization with the drive signal SCK having a period shorter than the period of receiving 10-bit digital data from each of the AD conversion units 306.

If, for example, A3-width image is read, the photoelectric conversion element 3d performs conversion from parallel data into serial data for all pixels, and if A4-width image is read, the parallel-serial conversion unit 32a performs conversion from parallel data into serial data for the pixels in the A-4 width area. In this case, the timing control unit 36d also shortens the 1-line period according to the image area. In other words, the photoelectric conversion element 3d can perform high-speed reading according to the image area.

FIG. 13 is a diagram of an example of operations of the photoelectric conversion element 3a and an example of operations of the photoelectric conversion element 3d (the third modification). FIG. 13(a) is a diagram of an example of operations of the photoelectric conversion element 3a. For example, when an A3 original is read, data are read from all pixels that output valid data in the photoelectric conversion element 3a. In the photoelectric conversion element 3a, data are read from all pixels including pixels that output invalid data even when a A4 original is read.

FIG. 13(b) is a diagram of an example of operations of the photoelectric conversion element 3d. The photoelectric conversion element 3d makes it possible to read data from pixels in an arbitrary area in the main-scanning direction. When an A3 original is read, in the photoelectric conversion element 3d, data are read from all pixels that output valid data. When an A4 original is read, under the control of the timing control unit 36d, in the photoelectric conversion element 3d, invalid data are not read but data are read from A4-width pixels that output valid data. Because the timing control unit 36d shortens the 1-line period according to the image area, the photoelectric conversion element 3d can perform high-speed reading according to the image area.

Figure 14:
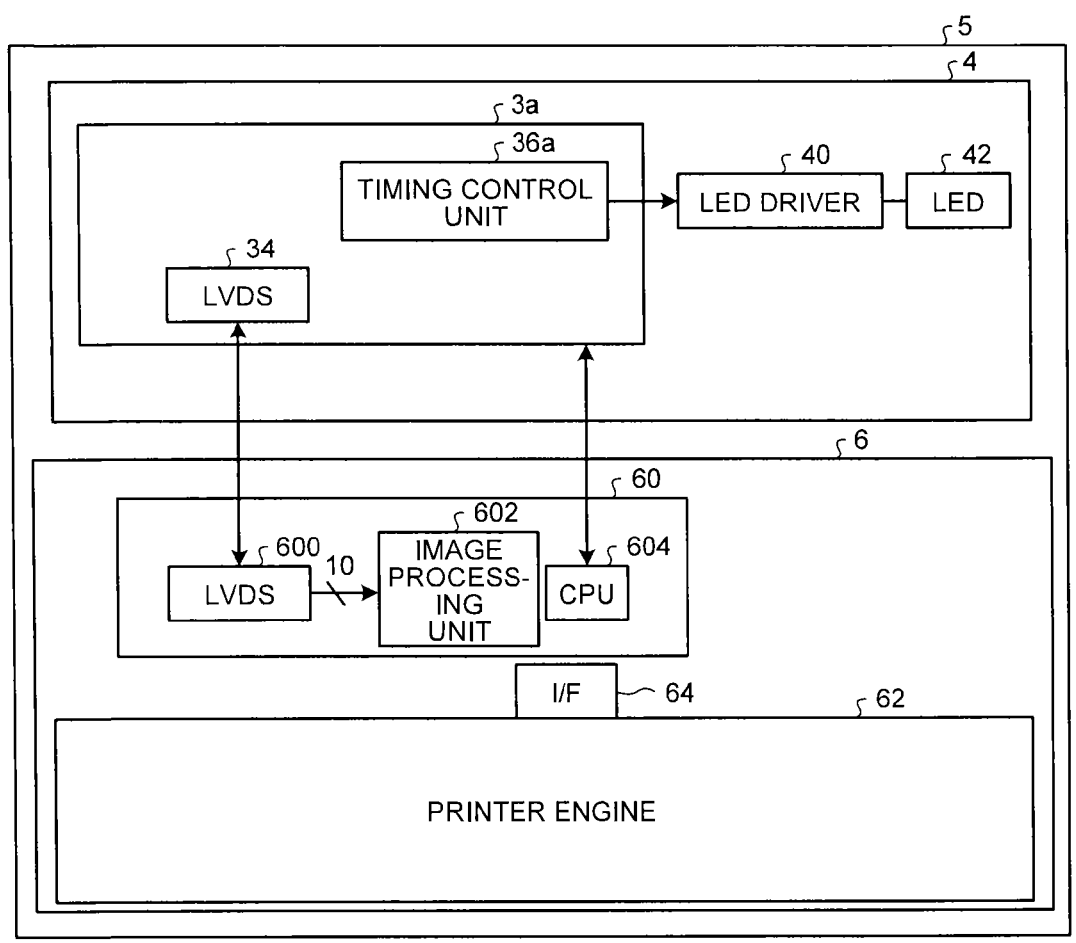
FIG. 14 is a diagram of an outline of an image forming apparatus that includes any one of the photoelectric conversion elements according to an embodiment.

An image forming apparatus that includes any one of the photoelectric conversion elements 3a to 3d will be described. FIG. 14 is a diagram of an outline of an image forming apparatus 5 that includes an image reading device 4 that includes any one of the photoelectric conversion elements 3a to 3d. The image forming apparatus 5 may be, for example, a copier, a multifunction peripheral (MFP), or the like that includes the image reading device 4 and an image forming unit 6.

The image reading device 4 includes, for example, the photoelectric conversion element 3a (or any one of the photoelectric conversion elements 3b, 3c, and 3d), an LED driver 40 and an LED 42. The LED driver 40 drives the LED 42 in synchronization with the line synchronizing signal (lsync) and the operation of the AD conversion units 306 (not shown). The LED 42 emits light to radiate the original. In the photoelectric conversion element 3a, in synchronization with the line synchronizing signal (lsync) and the operation of the AD conversion units 306 (not shown), the light receiving elements 300 receives the light reflected from the original and starts to store charge. After performing photoelectric conversion, AD conversion, and parallel-serial conversion, the LVDS 34 outputs the image data to the image forming unit 6.

The image forming unit 6 includes a processing unit 60 and a printer engine 62. The processing unit 60 and the printer engine 62 are interfaced with each other via an interface (I/F) 64.

The processing unit 60 includes the LVDS 600, the image processing unit 602, and the CPU 604. The CPU 604 controls each unit of the image forming apparatus 5, such as the photoelectric conversion element 3a.

The LVDS 34 outputs image data, line synchronizing signal (lsync), transmission clock and the like to the LVDS 600 at the latter stage. LVDS 600 converts the received image data, the line synchronizing signal, and the transmission clock into parallel 10-bit data. The image processing unit 602 uses the 10-bit data to perform image processing and outputs the image data and/or the like to the printer engine 62. The printer engine 62 uses the received image data to perform printing.

Because the image reading device 4 includes the photoelectric conversion element 3*a* (or any one of the photoelectric conversion element 3*b*, 3*c*, and 3*d*), occurrence of stripes in a read image and noise due to unnecessary radiation can be reduced. Because the image forming apparatus 5 includes the photoelectric conversion element 3*a* (or any one of the photoelectric conversion elements 3*b*, 3*c*, and 3*d*), even when an image that is read by the image reading device 4 is printed, occurrence of stripes in the printed image and noise due to unnecessary radiation can be reduced.

According to the embodiment, noise due to unnecessary radiation or the like can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A photoelectric conversion element comprising:
   a plurality of AD converters that convert respective analog signals representing amounts of charge stored in a plurality of light receiving elements into digital signals in parallel, each of the AD converters being configured to receive an analog signal only from one or few light receiving elements of the plurality of light receiving elements being in the whole of the photoelectric conversion element but not being in a part of the photoelectric conversion element; and
   a parallel-serial converter that performs parallel-serial conversion on the digital signals into which the analog signals have been converted in parallel by the AD converters, wherein
   when extracting all possible groups, each of which consists of all light receiving elements arranged in one direction over a length corresponding to a size of an image to be read, multiple AD converters are provided for any of the groups and none of the AD converters receives analog signals from all light receiving elements of any of the groups.

2. The photoelectric conversion element according to claim 1, further comprising:
   a first clock generator that generates a spread spectrum clock; and
   a second clock generator that generates a non-spread spectrum clock,
   wherein the parallel-serial converter operates in synchronization with the spread spectrum clock, and
   the AD converters operate in synchronization with the non-spread spectrum clock.

3. The photoelectric conversion element according to claim 1, further comprising a clock generator that generates a spread spectrum clock,
   wherein the AD converters and the parallel-serial converter operate or the parallel-serial converter operates in synchronization with the spread spectrum clock.

4. The photoelectric conversion element according to claim 1, wherein the light receiving elements are arrayed in one direction for each color of light for which charge is stored.

5. The photoelectric conversion element according to claim 1, further comprising:
   a plurality of signal holding units that hold the respective analog signals representing the amounts of charge stored in the light receiving elements,
   wherein the AD converters convert the respective analog signals held by the signal holding units into digital signals in parallel.

6. The photoelectric conversion element according to claim 5, wherein each of the signal holding units is a sample and hold circuit.

7. The photoelectric conversion element according to claim 5, the signal holding units are arranged in positions where the signal holding units do not block optical path of light that can be received by the light receiving elements.

8. The photoelectric conversion element according to claim 7, wherein
   the signal holding units are arrayed along the light receiving elements that are arranged in one direction for each color of light for which charge is stored.

9. The photoelectric conversion element according to claim 1, wherein the AD converters and the parallel-serial converter are arranged in positions where the AD converters and the parallel-serial converter do not block optical path of light that can be received by the light receiving elements.

10. The photoelectric conversion element according to claim 1, further comprising:
    a controller that controls the parallel-serial converter to output only selected digital signals.

11. The photoelectric conversion element according to claim 1, wherein an AD converter of the plurality of AD converters is provided for each of the plurality of light receiving elements, and a total number of the plurality of light receiving elements being in the whole of the photoelectric conversion element but not being a part of the photoelectric conversion element is equal to a total number of the plurality of AD converters being in the whole of the photoelectric conversion element but not being a part of the photoelectric conversion element.

12. The photoelectric conversion element according to claim 1, wherein an AD converter of the plurality of AD converters is provided for every two of the plurality of light receiving elements, and a total number of the plurality of light receiving elements being in the whole of the photoelectric conversion element but not being in a part of the photoelectric conversion element is twice a total number of the plurality of AD converters being in the whole of the photoelectric conversion element but not being in a part of the photoelectric conversion element.

13. The photoelectric conversion element according to claim 1, wherein an AD converter of the plurality of AD converters is provided for every three of the plurality of light receiving elements each one of which is of one of different colors, and a total number of the plurality of light receiving elements being in the whole of the photoelectric conversion element but not being in a part of the photoelectric conversion element is three times a total number of the plurality of AD converters being in the whole of the photoelectric conversion element but not being in a part of the photoelectric conversion element.

14. The photoelectric conversion element according to claim 1, wherein each of light receiving element sets includes three light receiving elements, one for each color, each of the light receiving element sets consisting of light receiving elements whose analog signals are received by a same AD converter.

15. The photoelectric conversion element according to claim 1, wherein light receiving elements whose analog signals are received by a same AD converter correspond to pixels of all colors at a same address position in a main scanning direction.

16. An image reading device comprising:
a photoelectric conversion element that includes
a plurality of AD converters that convert respective analog signals representing amounts of charge stored in a plurality of light receiving elements into digital signals in parallel, each of the AD converters being configured to receive an analog signal only from one or few light receiving elements of the plurality of light receiving elements being in the whole of the photoelectric conversion element but not being in a part of the photoelectric conversion element, and
a parallel-serial converter that performs parallel-serial conversion on the digital signals into which the analog signals have been converted in parallel by the AD converters, wherein
when extracting all possible groups, each of which consists of all light receiving elements arranged in one direction over a length corresponding to a size of an image to be read, multiple AD converters are provided for any of the groups and none of the AD converters receives analog signals from all light receiving elements of any of the groups.

17. The image reading device according to claim 16, wherein a timing of starting to read an image in a sub-scanning direction is synchronized with an operation of the AD converters.

18. An image forming apparatus comprising:
an image reading device; and
an image forming unit that forms an image from an image that is read by the image reading device, wherein
the image reading device includes a photoelectric conversion element, and
the photoelectric conversion element includes
a plurality of AD conversion units that convert respective analog signals representing amounts of charge stored in a plurality of light receiving elements into digital signals in parallel, each of the AD conversion units being configured to receive an analog signal only from one or few light receiving elements of the plurality of light receiving elements being in the whole of the photoelectric conversion element but not being in a part of the photoelectric conversion element and
a parallel-serial conversion unit that performs parallel-serial conversion on the digital signals into which the analog signals have been converted in parallel by the AD conversion units, and
when extracting all possible groups, each of which consists of all light receiving elements arranged in one direction over a length corresponding to a size of an image to be read, multiple AD conversion units are provided for any of the groups and none of the AD conversion units receives analog signals from all light receiving elements of any of the groups.

* * * * *